United States Patent
Zou et al.

(10) Patent No.: US 8,982,761 B2
(45) Date of Patent: Mar. 17, 2015

(54) METHOD, APPARATUS, AND SYSTEM FOR CARRYING OUT MULTIMEDIA SERVICE IN WIRELESS LOCAL AREA

(75) Inventors: Rong Zou, Shanghai (CN); Jiang Chen, Shanghai (CN); Guoping Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 243 days.

(21) Appl. No.: 13/559,023

(22) Filed: Jul. 26, 2012

(65) Prior Publication Data

US 2013/0094367 A1    Apr. 18, 2013

(30) Foreign Application Priority Data

Oct. 18, 2011  (CN) .......................... 2011 1 0316823

(51) Int. Cl.
*H04L 12/28*     (2006.01)
*H04J 3/26*      (2006.01)
(Continued)

(52) U.S. Cl.
CPC ........... *H04L 65/4076* (2013.01); *H04L 51/066* (2013.01); *H04L 12/189* (2013.01); *H04W 4/06* (2013.01); *H04L 65/80* (2013.01)
USPC ........ 370/312; 370/390; 370/432; 455/67.11; 455/500; 709/203; 709/224

(58) Field of Classification Search
CPC ....... H04W 84/02; H04W 4/06; H04W 24/00; H04W 72/005; H04W 80/04; H04W 36/08; H04W 36/14; H04W 36/18; H04W 36/0011; H04W 84/12; H04W 84/18; H04W 8/26; H04W 88/06; H04W 16/28; H04W 24/08; H04W 88/02; H04H 20/71; H04L 65/80; H04L 65/4076; H04L 12/18; H04L 12/185; H04L 12/189; H04L 12/1863; H04L 12/2697; H04L 12/5693; H04L 65/607; H04L 47/10; H04L 47/11; H04L 47/12; H04L 47/03; H04L 47/5602; H04L 47/30; H04L 47/32; H04L 47/34; H04L 47/2441; H04L 43/00; H04L 43/50; H04L 43/0852; H04L 41/12; H04L 45/00; H04L 45/02; H04L 45/04; H04L 45/16; H04L 49/90; H04L 49/201; H04L 29/06; H04L 29/0809; H04L 29/06095; H04L 29/08072; H04L 29/08576; H04L 1/0026; H04L 12/2602; H04L 29/06047; H04L 41/22; H04N 21/00; H04N 21/65; H04N 21/6408; H04N 21/6112; H04N 21/6131; H04N 21/8547; H04N 21/44004; H04Q 11/0478; H04B 7/0413; H04B 17/0042; H04B 17/0057; G01S 13/878; G06Q 30/02; G08C 17/02
USPC ......... 370/229, 232, 233, 234, 235, 241, 312, 370/331, 338, 252, 254, 390, 394, 432; 709/227, 203, 224; 455/39, 115.1, 500, 455/67.11
See application file for complete search history.

(56) References Cited

U.S. PATENT DOCUMENTS

2003/0188188 A1    10/2003  Padmanabhan et al.
2006/0018335 A1 *   1/2006  Koch et al. .................... 370/432
(Continued)

FOREIGN PATENT DOCUMENTS

| CN | 1961590 A    | 5/2007  |
|----|--------------|---------|
| CN | 101909194    | 12/2010 |
| RU | 2305863 C2   | 9/2007  |

OTHER PUBLICATIONS

Extended European Search Report issued in corresponding European Patent Application No. 12177495.4, mailed Feb. 26, 2013.
Mehdizadeh et al., "Quality-Improved and Secure Multicast Delivery Method in Mobile IPv6 Networks" Computers and Communications (ISCC), 2011 Symposium on IEEE, IEEE, Jun. 28, 2011.
(Continued)

*Primary Examiner* — Alpus H Hsu
*Assistant Examiner* — Dharmesh Patel
(74) *Attorney, Agent, or Firm* — Brinks Gilson & Lione (57) ABSTRACT

A method, an apparatus, and a system for carrying out a multimedia service are provided in a WLAN. The method includes: receiving a multicast data stream sent by a data server; and monitoring in real time a receiving rate of a terminal connected to an access point, if the receiving rate is higher than or equal to a multicast sending rate at which the access point sends multicast data, sending, in a multicast mode, the multicast data stream sent by the data server to the terminal, and if the receiving rate is lower than the multicast sending rate, converting the multicast data stream sent by the data server into a unicast data stream and sending the unicast data stream to the terminal.

15 Claims, 5 Drawing Sheets

(51) Int. Cl.
  *H04B 17/00* (2006.01)
  *H04B 7/00* (2006.01)
  *G06F 15/16* (2006.01)
  *G06F 15/173* (2006.01)
  *H04L 29/06* (2006.01)
  *H04L 12/18* (2006.01)
  *H04W 4/06* (2009.01)
  *H04L 12/58* (2006.01)

(56) References Cited

U.S. PATENT DOCUMENTS

2006/0098613 A1* 5/2006 Kish et al. .................... 370/338
2010/0260091 A1   10/2010 Seok
2011/0032832 A1*  2/2011 Jalali et al. .................. 370/252
2011/0216685 A1   9/2011 Kish et al.

OTHER PUBLICATIONS

Piamrat et al., "Q-DRAM: QoE-based Dynamic Rate Adaption Mechanism for Multicast in Wireless Networks" Global Telecommunications Conference, IEEE 2009.

Brenner, "A Technical Tutorial on the IEEE 802.11 Protol", Jul. 18, 1996.

IEEE 802.11a-1999, From Wikipedia, the free encyclopedia, Retrieved from "http://en.wikipedia.org/w/index.php?title=IEEE_802.11a-1999&oldid=508559934" Categories: IEEE 802.11, printed Aug. 30, 2012.

IEEE 802.11b-1999, From Wikipedia, the free encyclopedia, Retrieved from "http://en.wikipedia.org/w/index.php?title=IEEE_802.11b-1999&oldid=508560139" Categories: IEEE 802.11, printed Aug. 30, 2012.

IEEE 802.11n-2009, Description, From Wikipedia, the free encyclopedia, Aug. 30, 2012.

* cited by examiner

METHOD, APPARATUS, AND SYSTEM FOR CARRYING OUT MULTIMEDIA SERVICE IN WIRELESS LOCAL AREA

CROSS-REFERENCE TO RELATED APPLICATION

This application claims priority to Chinese Patent Application No. 201110316823.1, filed on Oct. 18, 2011, which is hereby incorporated by reference in its entirety.

FIELD

The present invention relates to the field of communications, and in particular, to a wireless local area network (Wireless Local Area Network, WLAN).

BACKGROUND

The WLAN (Wireless Local Area Network, wireless local area network) technology is popular in most users since it come out due to the advantages of convenience and low cost, and its technical standard is also developed quickly. With the popularity of the WLAN and the improvement of the performance, a solution to provide multimedia services based on the WLAN access technology is needed. One of the new problems that a network designer faces is how to use the WLAN to provide multimedia services such as VOIP (Voice over Internet Protocol, voice over internet protocol), video conferencing, and video on demand for users, wherever in an enterprise network, a telecommunication access network, a hot zone, or a particular enclosed region.

WLAN has some inherent characteristics of a wireless network, such as medium instability and interference. Therefore, a link inevitably has a certain packet loss ratio, and there is contending for air interface resources in a multi-user environment. However, a video service has high requirements on the bandwidth, delay, and jitter. Therefore, when WLAN provides the video service for a user, the required QOS (Quality of Service, quality of service) of the video service can hardly be ensured, and especially in the case that the number of users increases, the video quality deteriorates sharply.

SUMMARY

Embodiments of the present invention provide a method, an apparatus, and a system for carrying out a multimedia service in a WLAN, which can improve the quality of the multimedia service in the WLAN.

A method for carrying out a multimedia service in a wireless local area network includes: receiving a multicast data stream sent by a data server; monitoring in real time a receiving rate of a terminal connected to an access point, if the receiving rate is higher than or equal to a multicast sending rate at which the access point sends multicast data, sending, in a multicast mode, the multicast data stream sent by the data server to the terminal, and if the receiving rate is lower than the multicast sending rate, converting the multicast data stream sent by the data server into a unicast data stream and sending the unicast data stream to the terminal.

An access apparatus for carrying out a multimedia service in a wireless local area network includes: a judging module, configured to trigger a multicast module if a receiving rate of a terminal is higher than or equal to a multicast sending rate at which the access apparatus sends multicast data and trigger a multicast replication module if the receiving rate of the terminal is lower than the multicast sending rate of the access apparatus; the multicast module, configured to send, in a multicast mode, a multicast data stream sent by a data server to a transmitter; the multicast replication module, configured to convert the multicast data stream sent by the data server into a unicast data stream and send the unicast data stream to the transmitter; and the transmitter, configured to send the received multicast data stream or unicast data stream.

A wireless local area network for carrying out a multimedia service includes: a data server, an access controller, and an access point. The data server sends a multimedia data stream to a terminal through the access controller and the access point. The access point is configured to: if a rate of the terminal is higher than or equal to a multicast sending rate at which the access point sends multicast data, send, in a multicast mode, the multicast data stream sent by the data server to the terminal; and if the rate of the terminal is lower than the multicast sending rate of the access point, convert the multicast data stream sent by the data server into a unicast data stream and send the unicast data stream to the terminal.

As can be seen from the technical solutions, in the embodiments of the present invention, the receiving rate of the terminal is monitored, and when the receiving rate of the terminal is higher than or equal to the multicast sending rate of the access point, the multicast data stream sent by the data server is sent in a multicast mode to the terminal. Therefore, when there are many users, part of the terminals may receive the multicast data stream, which reduces the load of the access point, namely, the access apparatus, reduces the contending for an air interface, and ensures the quality of the multimedia service. When the receiving rate of the terminal is lower than the multicast sending rate, the multicast data stream sent by the data server is converted into a unicast data stream and sent to the corresponding terminal. As specified in the WLAN standard protocols, when a frame is sent in a unicast mode, the sending rate between the access point and the terminal can be adjusted automatically, so as to ensure that a terminal whose rate is lower than the multicast sending rate of the access point can also receive the data stream. To sum up, in the embodiments of the present invention, the mode for sending the multimedia data stream to the terminal by the access point is determined according to the receiving rate of the terminal, which improves the transmission quality of the multimedia data stream and enhances the user experience.

BRIEF DESCRIPTION OF THE DRAWINGS

To make the technical solutions provided in the embodiments of the present invention clearer, the accompanying drawings for illustrating the embodiments of the present invention are briefly described hereunder. Evidently, the accompanying drawings described below illustrate only some embodiments of the present invention, and a person of ordinary skill in the art can derive other drawings from such accompanying drawings without creative efforts.

DETAILED DESCRIPTION OF THE EMBODIMENTS

The technical solutions provided in the embodiments of the present invention are hereinafter described clearly and completely with reference to the accompanying drawings. Evidently, the embodiments described are only some, rather than all embodiments of the present invention. A person of ordinary skill in the art can derive other embodiments from the embodiments given herein without creative efforts, and all such embodiments are covered in the protection scope of the present invention.

Figure 1:
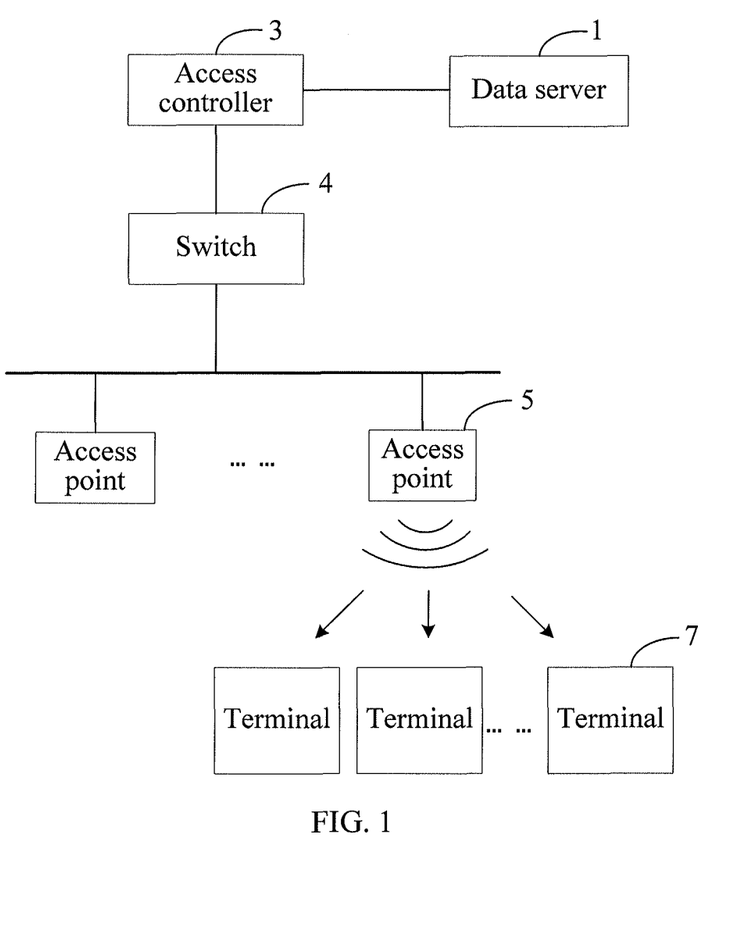
FIG. 1 is an architecture diagram of a system applied in an embodiment of the present invention.
Figure 2:
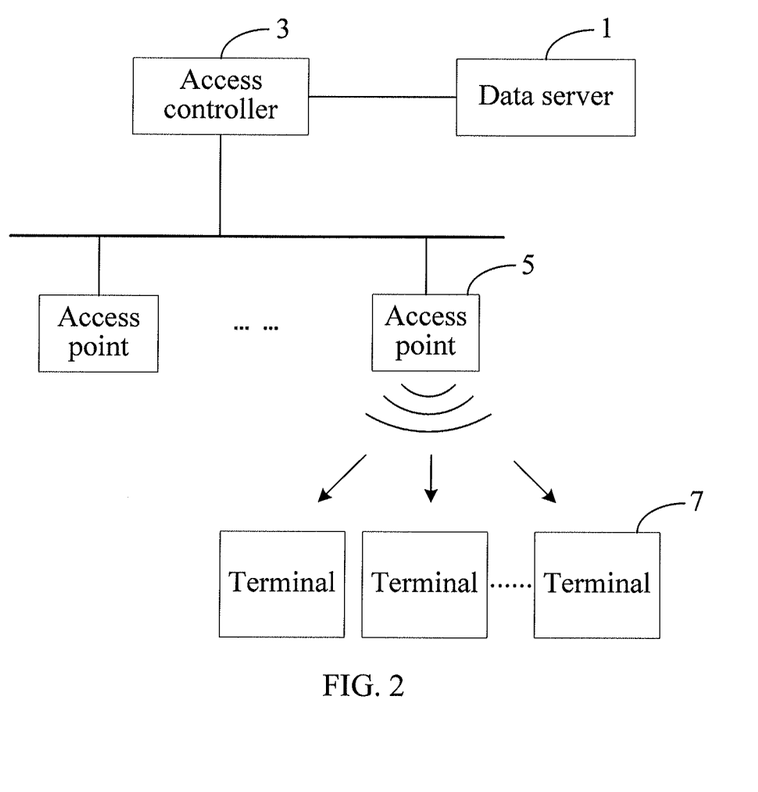
FIG. 2 is another architecture diagram of a system applied in an embodiment of the present invention.

FIG. 1 shows a system architecture applied in a method for carrying out a multimedia service in a WLAN (Wireless Local Area Network, wireless local area network) according to an embodiment of the present invention. A data server (Data Server) 1 sends a data stream to a terminal 7 through an access controller (Access Controller, AC) 3, a switch 4, and an access point (Access Point, AP) 5 sequentially. The switch 4 in the architecture is not essential. As shown in FIG. 2, the access controller 3 may directly send the data stream to the access point 5. The terminal 7 may be an electronic product that can use multimedia services in the wireless local area network, such as computers and mobile phones.

Figure 3:
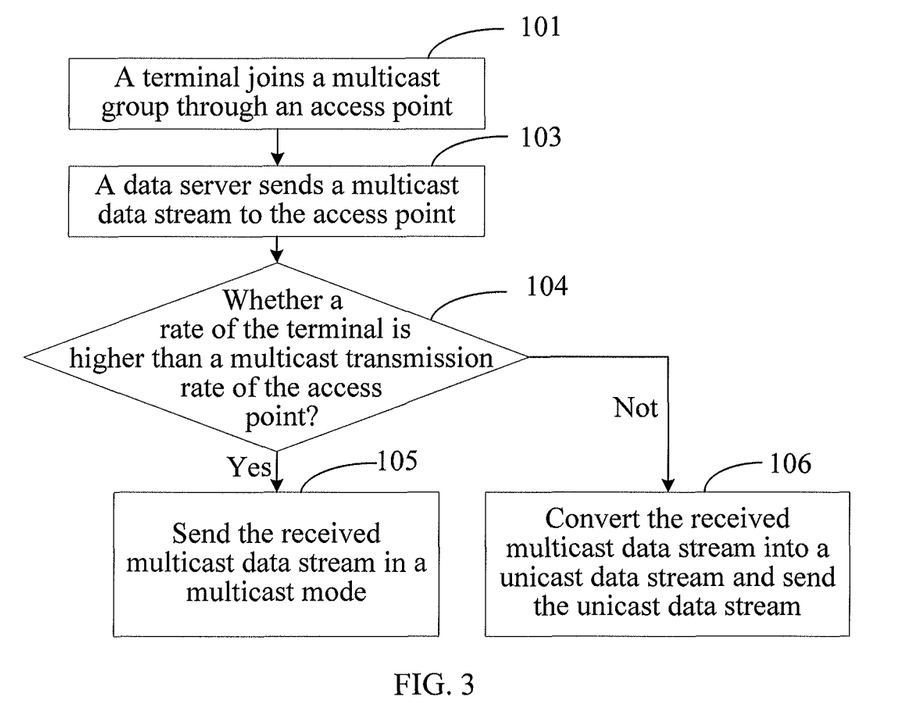
FIG. 3 illustrates a method for carrying out a multimedia service in a WLAN according to a first embodiment of the present invention.

FIG. 3 illustrates a method for carrying out a multimedia service in a WLAN according to a first embodiment of the present invention. The embodiment includes the following:

101. A terminal 7 joins a multicast group through an access point 5.

Specifically, the terminal 7 may establish a connection with the access point 5 in a video on demand mode and joins a multicast group. That is, the terminal 7 sends a multimedia play request to the access point 5 to establish a connection with the access point 5, and joins a multicast group.

Of course, the embodiment of the present invention is not limited to the foregoing mode for establishing a connection between the terminal 7 and a data server 1. Other modes applicable to the service in the present invention may also be used in the embodiment of the present invention and not detailed herein.

103. A data server 1 sends a multicast data stream to the access point 5. Specifically, the data server 1 sends one multicast data stream to the access point 5. When one program is played on demand by multiple terminals 7, only one multicast data stream is sent.

104. The access point 5 judge whether a receiving rate of the terminal is higher than a multicast sending rate at which the access point 5 sends multicast data. Specifically, the receiving rate of the terminal connected to the access point 5 is monitored in real time. If the receiving rate is higher than or equal to the multicast sending rate, step 105 is performed. If the receiving rate is lower than the multicast sending rate, step 106 is performed.

Specifically, as specified in the WLAN standard protocols, for example, the protocols 802.11a, 802.11b, 802.11g, and 802.11n developed by the WLAN IEEE (Institute of Electrical and Electronics Engineers, institute of electrical and electronics engineers), when the terminal 7 connects to the access point 5, the terminal 7 negotiates with the access point 5 a set of transmission rates supported by both. Therefore, the access point 5 can obtain the receiving rate of the terminal 7.

In practice, when the multicast sending rate at which the access point 5 sends multicast data is set, the following factors need to be considered. (1) The multicast sending rate must be higher than a bit rate of a video service, for example, if the bit rate of the video service is 2 M, the multicast rate at least cannot be lower than this rate. (2) The multicast sending rate is not lower than: total bandwidth/maximum number of video programs borne, for example, if the total bandwidth is 300 M and the maximum number of the videos borne is 30, the multicast sending rate must be higher than 10 M to ensure time for sending each video program stream. (3) On the basis that the preceding two conditions are satisfied, a low rate is selected as the multicast sending rate, because the lower the rate is, the lower the frame error rate is.

105. Send the received multicast data stream in a multicast mode.

Specifically, the access point 5 sends the multicast data stream sent by the data server 1, as a multicast data stream compliant with the WLAN standard protocols, for example, the WLAN IEEE 802.11a, 802.11b, 802.11g, and 802.11n protocols.

106. Convert the received multicast data stream into a unicast data stream and send the unicast data stream.

Specifically, the access point 5 converts the multicast data stream sent by the data server 1 into a unicast data stream compliant with the WLAN standard protocols, for example, the WLAN IEEE 802.11a, 802.11b, 802.11g, and 802.11n protocols. When the receiving rate of the terminal is lower than the multicast sending rate, the terminal is unable to receive the multicast data stream. As specified in the WLAN standard protocols, the rate of a data stream sent in a unicast mode between the access point and the terminal can be dynamically automatically adjusted. Therefore, a terminal can receive the data stream only after the access point converts the multicast data stream into a unicast data stream and sends the unicast data stream to the terminal.

The converting the multicast data stream into the unicast data stream and sending the unicast data stream may specifically include the following:

1061. Replicate the multicast data stream into at least one unicast data stream.

1063. Replace, according to a mapping relationship between a multicast MAC (Media Access Control, media access control) address of a multicast group that a terminal joins and an MAC address of the terminal obtained by the access point 5, the multicast MAC address of each the unicast data stream of the at least one unicast data stream with one MAC address of one terminal, and send each unicast data stream. The number of unicast data streams may be the same as the number of terminals receiving the unicast data streams. The mapping relationship between the multicast MAC address of the multicast group that the terminal joins and the MAC address of the terminal may be obtained through an IGMP snooping function enabled on the access point 5. The access point 5 may record and maintain the mapping relationship after obtaining the mapping relationship.

In the first embodiment of the present invention, the receiving rate of the terminal 7 is monitored, and when the receiving rate is higher than or equal to the multicast sending rate of the access point, the access point sends, in a multicast mode, the multicast data stream sent by the data server 1 to the terminal. Therefore, when there are many users, part of terminals may receive the multicast data stream, which reduces the load of the access point 5, reduces the contending for an air interface, thus ensures the quality of the multimedia service and improves the transmission efficiency of the multimedia service. When the receiving rate is lower than the multicast sending rate, the access point converts the multicast data stream sent by the data server 1 into a unicast data stream and sends the unicast data stream to the corresponding terminal. As specified in the WLAN standard protocols, for example, the WLAN IEEE 802.11a, 802.11b, 802.11g, and 802.11n protocols, when a frame is sent in a unicast mode, the sending rate between the access point 5 and the terminal 7 can be adjusted automatically, so as to ensure that a terminal whose receiving rate is lower than the multicast sending rate of the access point can also receive the data stream. To sum up, in the first embodiment of the present invention, the mode for sending the multimedia data stream to a terminal by the access point is determined according to the receiving rate of the terminal, which improves the transmission quality of the multimedia data stream and enhances the user experience.

Figure 4:
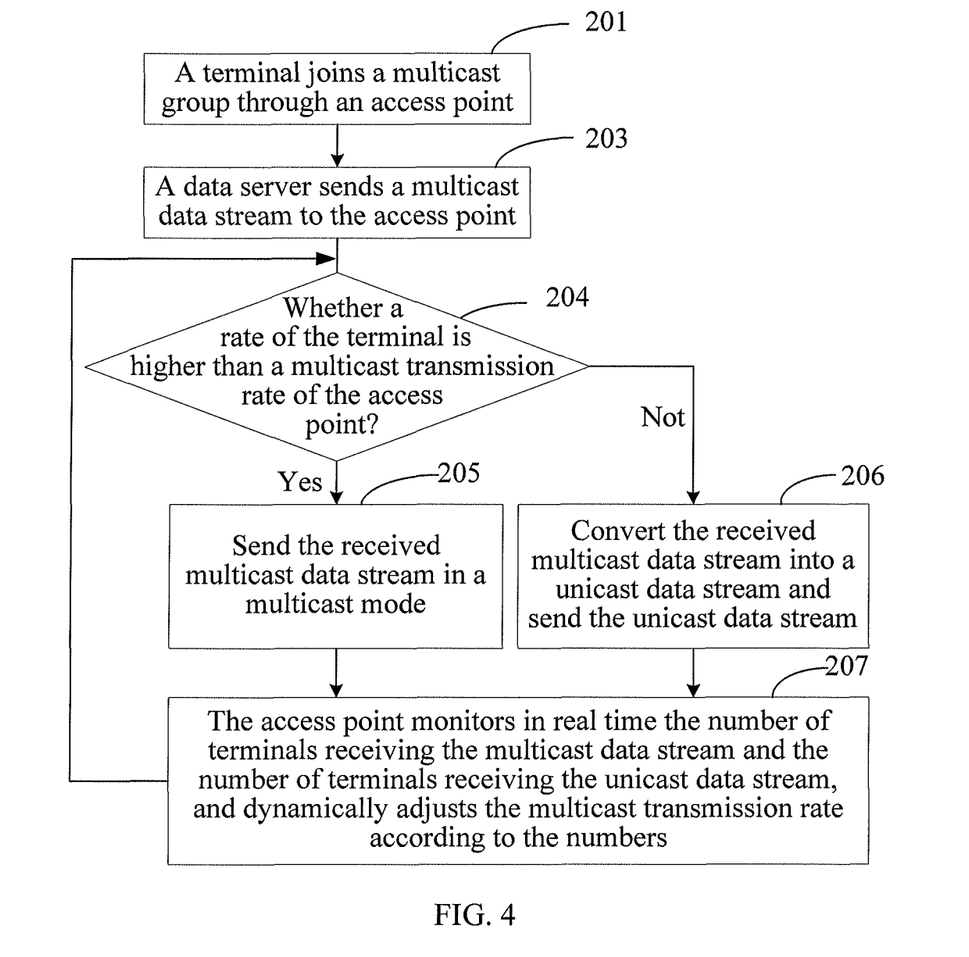
FIG. 4 illustrates a method for carrying out a multimedia service in a WLAN according to a second embodiment of the present invention.

FIG. 4 illustrates a method for carrying out a multimedia service in a WLAN according to a second embodiment of the present invention. The embodiment includes the following:

201. A terminal 7 joins a multicast group through an access point 5.

203. A data server 1 sends a multicast data stream to the access point 5. Specifically, the data server 1 sends one multicast data stream to the access point 5. When one program is played on demand by multiple terminals 7, only one multicast data stream is sent.

204. Judge whether a receiving rate of the terminal is higher than a multicast sending rate at which the access point 5 sends multicast data. Specifically, the receiving rate of the terminal connected to the access point 5 is monitored in real time. If the receiving rate is higher than or equal to the multicast sending rate, step 205 is performed. If the receiving rate is lower than the multicast sending rate, step 206 is performed.

205. Send the received multicast data stream in a multicast mode.

Specifically, the access point 5 sends the multicast data stream sent by the data server 1, as a multicast data stream compliant with the WLAN standard protocols, for example, the WLAN IEEE 802.11a, 802.11b, 802.11g, and 802.11n protocols.

206. Convert the received multicast data stream into a unicast data stream and send the unicast data stream.

Specifically, the access point 5 converts the multicast data stream sent by the data server 1, into a unicast data stream compliant with the WLAN standard protocols, for example, compliant with the WLAN IEEE 802.11a, 802.11b, 802.11g, and 802.11n protocols.

Steps 201, 203, 204, 205, and 206 may be specifically performed in a manner as described in steps 101, 103, 104, 105, and 106 respectively and are not detailed herein.

207. Monitor in real time a first terminal number of terminals receiving the multicast data stream and a second terminal number of terminals receiving the unicast data stream, and dynamically adjust the multicast sending rate according to the first terminal number and the second terminal numbers. Afterward, according to the adjusted multicast sending rate, the access point 5 determines a mode for sending the data stream.

Specifically, the access point 5 can monitor the number of terminals connected to the access point 5 through IGMP SNOOPING. According to step 106, namely, the step of converting the multicast data stream into a unicast data stream, the second terminal number of terminals receiving the unicast data stream can be obtained. Therefore, among the terminals connected to the access point 5, the first terminal number of terminals receiving the multicast data stream can be obtained.

When the second terminal number is more, the multicast sending rate is probably high, causing a majority of terminals to have a receiving rate lower than the multicast sending rate and fail to receive the multicast data stream. In this case, the multicast sending rate may be reduced in an acceptable range so that most of the terminals can receive the multicast data stream. If the multicast sending rate of the access point is low and affects the transmission efficiency, the multicast sending rate may be increased. Therefore, the multicast sending rate may be adjusted dynamically according to actual requirements to improve the transmission efficiency and quality.

For the acceptable range mentioned, a set of transmission rates supported and negotiated by the terminal 7 and the access point 5, and the three factors need to be considered as mentioned in step 104, needs to be considered.

In the second embodiment of the present invention, because the multicast sending rate is dynamically adjusted according to the first terminal number of terminals receiving the multicast data stream and the second terminal number of terminals receiving the unicast data stream, it is ensured that most of the terminals 7 connected to the access point 5 can receive the multicast data stream. Therefore, the transmission efficiency and quality of the multimedia service are improved and the user experience is enhanced.

Figure 5:
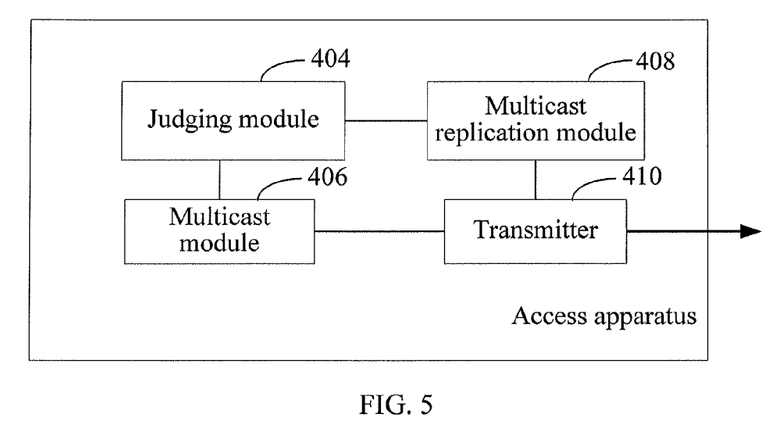
FIG. 5 illustrates an access apparatus for carrying out a multimedia service in a WLAN according to a third embodiment of the present invention.

FIG. 5 illustrates an access apparatus for carrying out a multimedia service in a WLAN according to a third embodiment of the present invention. The access apparatus includes:

a judging module 404, configured to trigger a multicast module 406 if a receiving rate of a terminal is higher than or equal to a multicast sending rate at which the access apparatus sends multicast data; and trigger a multicast replication module 408 if the receiving rate of the terminal is lower than the multicast sending rate of the access apparatus;

the multicast module 406, configured to send, in a multicast mode, a multicast data stream sent by a data server to a transmitter 410; and specifically, configured to send the multicast data stream sent by the data server, as a multicast data stream compliant with the WLAN standard protocols, for example, the WLAN IEEE 802.11a, 802.11b, 802.11g, and 802.11n protocols;

the multicast replication module 408, configured to convert the multicast data stream sent by the data server into a unicast data stream and then send the unicast data stream to the transmitter 410; and specifically, configured to send the multicast data stream sent by the data server, as a unicast data stream compliant with the WLAN standard protocols, for example, the WLAN IEEE 802.11a, 802.11b, 802.11g, and 802.11n protocols; and the transmitter 410, configured to send the multicast data stream or the unicast data stream.

The multicast replication module 408 is specifically configured to obtain a mapping relationship between a multicast MAC address of a multicast group that a terminal joins and a MAC address of the terminal, replicate the multicast data stream sent by the data server into at least one unicast data stream, replace, according to the mapping relationship, the multicast MAC address of each unicast data stream of the at least one unicast data stream with one MAC address of one terminal, send each unicast data streams to the transmitter 410. Specifically, through an IGMP SNOOPING function in the IGMP protocol, the mapping relationship between the multicast MAC address of the multicast group that the terminal joins and the MAC address of the terminal is obtained. Further, the multicast replication module 408 is further configured to record and maintain the mapping relationship between the multicast MAC address of the multicast group that the terminal joins and the MAC address of the terminal. The number of the at least one unicast data stream may be the same as the number of terminals receiving the unicast data stream. The unicast data stream sent by the transmitter 410 is the each unicast data streams.

In the third embodiment of the present invention, the receiving rate of the terminal is monitored, and when the receiving rate is higher than or equal to the multicast sending rate of the access apparatus, the access apparatus sends the multicast data stream sent by the data server to the terminal, as a multicast data stream compliant with the WLAN standard protocols. Therefore, when there are many users, part of the terminals may receive the multicast data stream, the load of the access apparatus is reduced, the contending for an air interface is reduced, the quality of the multimedia service is ensured, and meanwhile, the transmission efficiency of the multimedia service is improved. When the receiving rate is lower than the multicast sending rate, the access apparatus converts the multicast data stream sent by the data server into a unicast data stream compliant with the WLAN standard protocols and sends the unicast data stream to the corresponding terminal, so as to ensure that terminals whose rate is lower than the multicast sending rate of the access apparatus can also receive the data stream. To sum up, in the third embodiment of the present invention, the mode for sending the multimedia data stream to a terminal by the access apparatus is determined by the access apparatus according to the receiving rate of the terminal, which improves the transmission quality of the multimedia data stream and enhances the user experience.

Figure 6:
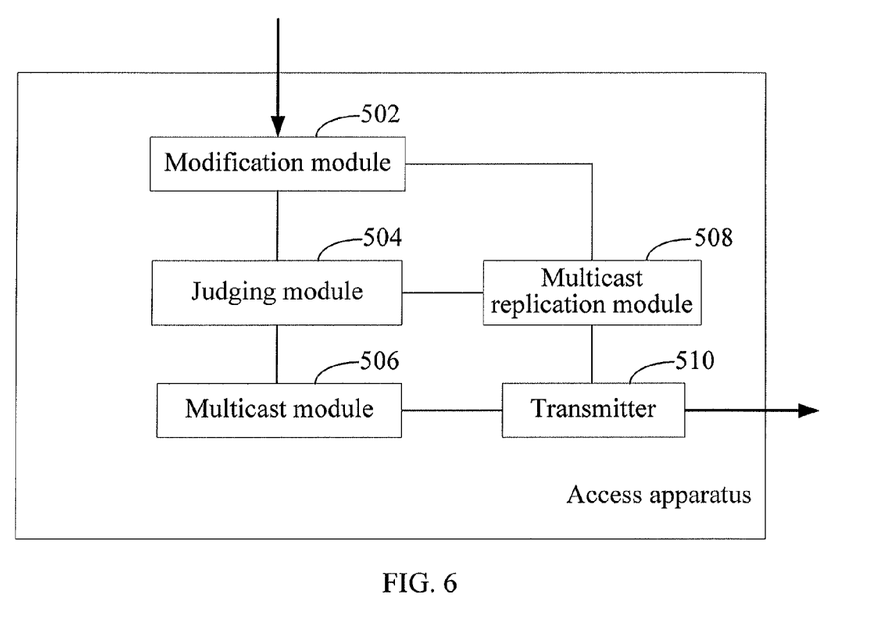
FIG. 6 illustrates an access apparatus for carrying out a multimedia service in a WLAN according to a fourth embodiment of the present invention.

FIG. 6 illustrates an access apparatus for carrying out a multimedia service in a WLAN according to a fourth embodiment of the present invention. The access apparatus includes:

a modification module 502, configured to monitor in real time the first terminal number of terminals receiving a multicast data stream and the second terminal number of terminals receiving a unicast data stream, and dynamically adjust a multicast sending rate according to the first terminal number and the second terminal number;

a judging module 504, configured to trigger a multicast module 506 if a receiving rate of a terminal is higher than or equal to the multicast sending rate at which the access apparatus sends multicast data; and trigger a multicast replication module 508 if the receiving rate of the terminal is lower than the multicast sending rate of the access apparatus;

the multicast module 506, configured to send, in a multicast mode, a multicast data stream sent by a data server to a transmitter 510; and specifically, configured to send the multicast data stream sent by the data server 1, as a multicast data stream compliant with the WLAN standard protocols, for example, the WLAN IEEE 802.11a, 802.11b, 802.11g, and 802.11n protocols;

the multicast replication module 508, configured to convert the multicast data stream sent by the data server into a unicast data stream, and then send the unicast data stream to the transmitter 510; and the transmitter 510, configured to send the multicast data stream or the unicast data stream.

The multicast replication module 508 is specifically configured to obtain a mapping relationship between a multicast MAC address of a multicast group that the terminal joins and a MAC address of the terminal, replicate the multicast data stream sent by the data server into at least one unicast data stream, replace, according to the mapping relationship, the multicast MAC address of each unicast data stream of the at least one unicast data stream with one MAC address of one terminal, and send each unicast data stream to the transmitter 510. Specifically, through an IGMP SNOOPING function in the IGMP protocol, the mapping relationship between the multicast MAC address of the multicast group that the terminal joins and the MAC address of the terminal is obtained. Further, the multicast replication module 508 is further configured to record and maintain the mapping relationship between the multicast MAC address of the multicast group that the terminal joins and the MAC address of the terminal. The number of at least one unicast data stream may be the same as the second terminal number of terminals receiving the unicast data stream. The unicast data stream sent by the transmitter 510 is the each unicast data stream.

In the fourth embodiment of the present invention, because the multicast sending rate is dynamically adjusted according to the first terminal number of terminals receiving the multicast data stream and the second terminal number of terminals receiving the unicast data stream, it is ensured that most of the terminals 7 connected to the access point 5 can receive the multicast data stream. Therefore, the transmission efficiency and quality of the multimedia service are improved and the user experience is enhanced.

An embodiment of the present invention also provides a WLAN system for carrying out a multimedia service. As shown in FIG. 1, the WLAN system includes a data server 1, an access controller 3, a switch 4, and an access point 5. The data server 1 sends a data stream to a terminal 7 through the access controller 3, the switch 4, and the access point 5 sequentially. The switch 4 in the architecture is not essential. As shown in FIG. 2, the access controller 3 may directly transmit the data stream to the access point 5.

The access point 5 is configured to: if a receiving rate of the terminal is higher than or equal to a multicast sending rate at which the access point 5 sends multicast data, send, in a multicast mode, a multicast data stream sent by the data server to the terminal; and if the receiving rate of the terminal is lower than the multicast sending rate of the access point 5, convert the multicast data stream sent by the data server into a unicast data stream and send the unicast data stream to the terminal. Specifically, the multicast data stream sent by the data server is sent as a multicast data stream or a unicast data stream compliant with the WLAN standard protocols, for example, the WLAN IEEE 802.11a, 802.11b, 802.11g, and 802.11n protocols.

Further, the access point 5 is further configured to monitor in real time the first terminal number of terminals receiving the multicast data stream and the second terminal number of terminals receiving the unicast data stream, and dynamically adjust the multicast sending rate according to the first terminal number and the second terminal number of. Specifically, the access point 5 can monitor the number of terminals connected to the access point 5 through IGMP SNOOPING. According to step 106, the step of converting multicast into unicast, the number of the terminals receiving the unicast data stream can be obtained. Therefore, among the terminals connected to the access point 5, the number of the terminals receiving the multicast data stream can be obtained. When there are more terminals receiving the unicast data stream, the multicast sending rate is probably high, causing a majority of terminals to fail to receive the multicast data stream. In this case, the multicast sending rate may be reduced in an acceptable range so that most of the terminals can receive the multicast data stream. If the multicast sending rate of the access point is low and affects the transmission efficiency, the multicast sending rate may be increased.

The access point 5 being configured to convert the received multicast data stream into a unicast data stream and send the unicast data stream is specifically that the access point 5 is configured to replicate the multicast data stream into at least one unicast data stream, replace, according to a mapping relationship between a multicast MAC address of a multicast group that a terminal joins and a MAC address of the terminal, the multicast MAC address of each of the unicast data streams in the at least one unicast data stream with the MAC address of one terminal, send each of the unicast data streams. The number of at least one unicast data stream may be the same as the second terminal number of terminals receiving the unicast data stream. Further, the access point 5 is further configured to obtain the mapping relationship between the multicast MAC address of the multicast group that the terminal joins and the MAC address of the terminal. Specifically, through an IGMP SNOOPING function in the IGMP protocol, the mapping relationship between the multicast MAC address of the multicast group that the terminal joins and the MAC address of the terminal can be obtained. Further, the access point 5 is further configured to record and maintain the mapping relationship between the multicast MAC address of the multicast group that the terminal joins and the MAC address of the terminal.

An embodiment of an internal structure of the access point 5 may be made reference to the third or fourth embodiment of the present invention. A running process of the WLAN system may be made reference to the first and second embodiments of the present invention. Description is not further repeated herein.

A person of ordinary skill in the art can understand that all or a part of the processes in the preceding method embodiments may be implemented by hardware or by a computer program instructing relevant hardware. The computer program may be stored in a computer readable storage medium. When the computer program is executed, the processes of the preceding method embodiments are performed. The storage medium may be a magnetic disk, an optical disc, a read-only memory (ROM, Read-Only Memory), or a random access memory (RAM, Random Access Memory).

The principle and implementation of the present invention are described herein through specific embodiments. The description of the embodiments is merely provided for ease of understanding of the method and idea of the present invention. A person of ordinary skill in the art can make variations and modifications with respect to the implementation and applicability according to the idea of the present invention. Therefore, the specification shall not be construed as a limitation on the present invention.

What is claimed is:

1. A method for carrying out a multimedia service in a wireless local area network, comprising:
    receiving, by an access apparatus, a multicast data stream sent by a data server;
    monitoring, by the access apparatus, in real time a receiving rate of a terminal connected the access apparatus; and
    determining, by the access apparatus, a unicast mode or a multicast mode for sending the multicast data stream to the terminal based on whether the receiving rate of the terminal is lower than a multicast sending rate at which the access apparatus sends multicast data;
    if the receiving rate of the terminal is higher than or equal to the multicast sending rate, sending, in the multicast mode, the multicast data stream to the terminal, and
    if the receiving rate of the terminal is lower than the multicast sending rate, converting the multicast data stream into a unicast data stream and sending, in the unicast mode, the unicast data stream to the terminal, wherein the converting the received multicast data stream into a unicast data stream and sending the unicast data stream to the terminal comprise:
    replicating the multicast data stream into at least one unicast data stream;
    obtaining, a mapping relationship between a multicast media access control address of a multicast group that the terminal joins and a media access control address of the terminal, through an IGMP snooping function; and
    replacing, according to the obtained mapping relationship between the multicast media access control address of the multicast group that a terminal joins and the media access control address of the terminal, the multicast media access control address of each unicast data stream of the at least one unicast data stream with a media access control address of one terminal, and sending each unicast data stream.

2. The method for carrying out a multimedia service in a wireless local area network according to claim 1, further comprising:
    monitoring in real time a number of terminals receiving the unicast data stream, and dynamically adjusting the multicast sending rate according to the number of terminals receiving the unicast data stream.

3. The method for carrying out a multimedia service in a wireless local area network according to claim 2, wherein the converting the received multicast data stream into a unicast data stream and sending the unicast data stream to the terminal comprise:
    replicating the multicast data stream into at least one unicast data stream; and
    replacing, according to an obtained mapping relationship between a multicast media access control address of a multicast group that a terminal joins and a media access control address of the terminal, the multicast media access control address of each unicast data stream of the at least one unicast data stream with the media access control address of one terminal, and sending each unicast data stream.

4. The method for carrying out a multimedia service in a wireless local area network according to claim 3, wherein before replacing the multicast media access control address of each unicast data stream with the media access control address of one terminal and sending each unicast data stream, the method comprises:
    obtaining, the mapping relationship between the multicast media access control address of the multicast group that the terminal joins and the media access control address of the terminal, through an IGMP snooping function.

5. The method for carrying out a multimedia service in a wireless local area network according to claim 2, wherein the dynamically adjusting the multicast sending rate according to the number of terminals receiving the unicast data stream comprise:
    reducing the multicast sending rate in an acceptable range when the number of terminals receiving the unicast data stream is more; wherein the acceptable range is determined according to a set of transmission rates supported and negotiated by the terminals and the access apparatus, and factors for setting the multicast sending rate.

6. The method for carrying out a multimedia service in a wireless local area network according to claim 5, wherein the factors for setting the multicast sending rate comprise at least one of the following:
    (1) the multicast sending rate is higher than a bit rate of the multimedia service;
    (2) the multicast sending rate is not lower than: total bandwidth/maximum number of multimedia services borne;
    (3) on the basis that the preceding two factors are satisfied, a low rate is selected as the multicast sending rate.

7. An access apparatus for carrying out a multimedia service in a wireless local area network, comprising:

a judging module, configured to determine a unicast mode or a multicast mode for sending a multicast data stream to a terminal based on whether a receiving rate of a terminal is lower than a multicast sending rate at which the access apparatus sends multicast data; trigger a multicast module if the receiving rate of the terminal is higher than or equal to the multicast sending rate; and trigger a multicast replication module if the receiving rate of the terminal is lower than the multicast sending rate of the access apparatus;

the multicast module, configured to send, in the multicast mode, a multicast data stream sent by a data server to a transmitter;

the multicast replication module, configured to convert the multicast data stream sent by the data server into a unicast data stream and send, in the unicast mode, the unicast data stream to the transmitter; and the transmitter, configured to send the received multicast data stream or unicast data stream, wherein the multicast replication module is configured to obtain a mapping relationship between a multicast media access control address of a multicast group that a terminal joins and a media access control address of the terminal, replicate the multicast data stream sent by the data server into at least one unicast data stream, replace, according to the mapping relationship, the multicast media access control address of each unicast data stream of the at least one unicast data stream with one media access control address of one terminal, and send each unicast data stream to the transmitter, wherein the unicast data stream sent by the transmitter comprises the unicast data stream.

8. The access apparatus for carrying out a multimedia service in a wireless local area network according to claim 7, further comprising:
a modification module, configured to monitor in real time a number of terminals receiving the unicast data stream, and dynamically adjust the multicast sending rate according to the number of terminals receiving the unicast data stream.

9. The access apparatus for carrying out a multimedia service in a wireless local area network according to claim 8, wherein the multicast replication module is specifically configured to obtain a mapping relationship between a multicast media access control address of a multicast group that a terminal joins and a media access control address of the terminal, replicate the multicast data stream sent by the data server into at least one unicast data stream, replace, according to the mapping relationship, the multicast media access control address of each unicast data stream of the at least one unicast data stream with one media access control address of one terminal, and send each unicast data stream to the transmitter, wherein the unicast data stream sent by the transmitter is the each unicast data stream.

10. The wireless local area network for carrying out a multimedia service according to claim 8, wherein the access point is further configured to monitor in real time a number of terminals receiving the unicast data stream, and dynamically adjust the multicast sending rate according to the number of terminals receiving the unicast data stream.

11. The wireless local area network for carrying out a multimedia service according to claim 10, wherein the access point being configured to convert the received multicast data stream into a unicast data stream and send the unicast data stream is that:
the access point is configured to replicate the multicast data stream sent by the data server into at least one unicast data stream, replace, according to an obtained mapping relationship between a multicast media access control address of a multicast group that a terminal joins and a media access control address of the terminal, the multicast media access control address of each unicast data stream of the at least one unicast data stream with the media access control address of one terminal, send the each unicast data streams.

12. The access apparatus for carrying out a multimedia service in a wireless local area network according to claim 8, wherein the modification module is configured to reduce the multicast sending rate in an acceptable range when the number of terminals receiving the unicast data stream is more; wherein the acceptable range is determined according to a set of transmission rates supported and negotiated by the terminals and the access apparatus, and factors for setting the multicast sending rate.

13. The access apparatus for carrying out a multimedia service in a wireless local area network according to claim 12, wherein the factors for setting the multicast sending rate comprise at least one of the following:
(1) the multicast sending rate is higher than a bit rate of the multimedia service;
(2) the multicast sending rate is not lower than: total bandwidth/maximum number of multimedia services borne; and
(3) on the basis that the preceding two factors are satisfied, a low rate is selected as the multicast sending rate.

14. A wireless local area network for carrying out a multimedia service, comprising a data server, an access controller, and an access point, and the data server configured to sends a multicast data stream to a terminal through the access controller and the access point, wherein the access point is configured to: determine a unicast mode or a multicast mode for sending the multicast data stream to the terminal based on whether a receiving rate of a terminal is lower than a multicast sending rate at which the access apparatus sends multicast data; if the receiving rate of the terminal is higher than or equal to the multicast sending rate, send, in the multicast mode, the multicast data stream sent by the data server to the terminal; and if the receiving rate of the terminal is lower than the multicast sending rate of the access point, convert the multicast data stream sent by the data server into a unicast data stream and send, in the unicast mode, the unicast data stream to the terminal,
wherein the access point is configured to replicate the multicast data stream sent by the data server into at least one unicast data stream, replace, according to an obtained mapping relationship between a multicast media access control address of a multicast group that a terminal joins and a media access control address of the terminal, the multicast media access control address of each unicast data stream of the at least one unicast data stream with the media access control address of one terminal, send the unicast data streams.

15. A non-transitory computer readable medium comprising computer executable instructions that when executed by a processor cause the processor to perform the following:
receive a multicast data stream sent by a data server;
monitor in real time a receiving rate of a terminal connected to the access apparatus; and
determine a unicast mode or a multicast mode for sending the multicast data stream to the terminal based on whether the receiving rate of the terminal is lower than a multicast sending rate at which the access apparatus sends multicast data;

if the receiving rate of the terminal is higher than or equal to the multicast sending rate, send, in the multicast mode, the multicast data stream to the terminal, and if the receiving rate of the terminal is lower than the multicast sending rate, replicate the multicast data stream into at least one unicast data stream; obtain, a mapping relationship between a multicast media access control address of a multicast group that the terminal joins and a media access control address of the terminal, through an IGMP snooping function; and replace, according to the obtained mapping relationship between the multicast media access control address of the multicast group that the terminal joins and the media access control address of the terminal, the multicast media access control address of each unicast data stream of the at least one unicast data stream with the media access control address of one terminal, and sending each unicast data stream.

\* \* \* \* \*